(12) United States Patent
Zhao et al.

(10) Patent No.: US 10,174,204 B2
(45) Date of Patent: Jan. 8, 2019

(54) METHOD FOR PREPARATION OF CARBON QUANTUM DOTS AND APPLICATION

(71) Applicant: INSTITUTE OF PROCESS ENGINEERING, CHINESE ACADEMY OF SCIENCES, Beijing (CN)

(72) Inventors: He Zhao, Beijing (CN); Hongbin Cao, Beijing (CN); Di Zhang, Beijing (CN)

(73) Assignee: INSTITUTE OF PROCESS ENGINEERING, CHINESE ACADEMY OF SCIENCES (CN)

( * ) Notice: Subject to any disclaimer, the term of this patent is extended or adjusted under 35 U.S.C. 154(b) by 166 days.

(21) Appl. No.: 15/362,144

(22) Filed: Nov. 28, 2016

(65) Prior Publication Data

US 2017/0152385 A1   Jun. 1, 2017

(30) Foreign Application Priority Data

Nov. 27, 2015   (CN) .......................... 2015 1 0847590

(51) Int. Cl.
| | | |
|---|---|---|
| C09C 1/44 | (2006.01) | |
| C09C 3/08 | (2006.01) | |
| B82Y 30/00 | (2011.01) | |
| B82Y 40/00 | (2011.01) | |
| C01B 32/00 | (2017.01) | |
| C01B 32/15 | (2017.01) | |

(52) U.S. Cl.
CPC .................. *C09C 1/44* (2013.01); *C09C 3/08* (2013.01); *B82Y 30/00* (2013.01); *B82Y 40/00* (2013.01); *C01B 32/00* (2017.08); *C01B 32/15* (2017.08); *C01P 2004/04* (2013.01); *C01P 2004/64* (2013.01); *Y10S 977/774* (2013.01); *Y10S 977/892* (2013.01)

(58) Field of Classification Search
CPC .. C09C 1/44; C09C 3/08; B82Y 30/00; B82Y 40/00; Y10S 977/774; Y10S 977/892; C01P 2004/04; C01P 2004/64; C01B 32/00; C01B 32/15
USPC ..... 252/502, 510, 511, 500; 423/445 R, 448, 423/449.1, 460, 447.4, 461, 449.2
See application file for complete search history.

(56) References Cited

U.S. PATENT DOCUMENTS

| | | | | |
|---|---|---|---|---|
| 9,919,927 B2* | 3/2018 | Tour | ...................... | C01B 32/194 |
| 10,012,657 B2* | 7/2018 | Strano | .................... | G01N 33/84 |
| 2009/0291844 A1* | 11/2009 | Hou | .......................... | A61L 2/03 502/160 |
| 2010/0010285 A1* | 1/2010 | Ebron | .................... | A01N 59/00 588/320 |
| 2010/0126563 A1* | 5/2010 | Park | ..................... | C07D 333/24 136/252 |
| 2013/0041200 A1* | 2/2013 | Sorokin | ................. | C02F 1/722 588/316 |
| 2013/0156678 A1* | 6/2013 | Banerjee | ................ | B82Y 30/00 423/445 R |
| 2017/0152141 A1* | 6/2017 | Zhao | .................... | B01J 37/0219 |

FOREIGN PATENT DOCUMENTS

| | | | |
|---|---|---|---|
| CN | 104752727 A | 7/2015 | |
| WO | WO-2014179708 A1 * | 11/2014 | ......... C01B 31/0446 |

OTHER PUBLICATIONS

Zhou et al., "Photo-Fenton Reaction of Graphene Oxide: A New Strategy to Prepare Graphene Quantum Dots for DNA Cleavage." ACSNANO. vol. 6, No. 8, 2012, pp. 6592-6599.

Zhu et al., "Molecular mechanism for metal-independent production of hydroxyl radicals by hydrogen peroxide and halogenated quinones." PNAS. vol. 104, No. 45, 2007, pp. 17575-17578.

* cited by examiner

*Primary Examiner* — Douglas J McGinty

(74) *Attorney, Agent, or Firm* — McDonald Hopkins LLC

(57) ABSTRACT

The present invention provides carbon quantum dots, preparation method and uses thereof. The preparation method of the carbon quantum dots comprises the following steps: (1) preparing a dispersion of carbon based material; (2) mixing a solution of halogenated quinone with the dispersion of carbon based material and preparing a dispersion of carbon based-halogenated quinone composite material by halogenated quinone grafting method; (3) adding a solution of $H_2O_2$ to the dispersion of carbon based-halogenated quinone composite material and carrying out reaction thereof, obtaining reaction products; (4) carrying out solid-liquid separation to the reaction products, with the resulting filtrate continuing to react, thus obtaining a dispersion of carbon quantum dots. This method adopts metal-free catalytic oxidation, the process of which is safe, convenient and low-cost, and is performed under a mild reaction condition without adding additional substances which are difficult to be separated. The obtained quantum dots have a good dispersibility and can be easily separated, also can achieve pollution treatment using pollutants. In addition, the prepared carbon quantum dots have a broad application prospect in the fields of organic pollutant degradation, electrochemical sensors, super capacitors, luminescent materials and photoelectric devices, etc.

18 Claims, 1 Drawing Sheet

METHOD FOR PREPARATION OF CARBON QUANTUM DOTS AND APPLICATION

TECHNICAL FIELD

The present invention belongs to the technical field of catalytic nano-materials, specifically relates to carbon quantum dots, preparation method and uses thereof.

BACKGROUND ART

Carbon quantum dots (CQDs) have a lateral size of below 100 nm, a discrete electronic belt, typical semiconductor characteristics, photoluminescence property, ultra-small size and nontoxicity, and thus exhibit a broad application prospect as a sensing electrode material.

Methods for synthesizing CQDs include hydrothermal method, electrochemical method, chemically stripping carbon fiber method, UV etching method, solution chemical method, ultrasonic wave method and microwave method, etc. However, due to complicated process, complex doping conditions, harsh reaction conditions, time consumption, low yield and the damage of the aromatic carbon frame, large-scale production and application of CQDs are limited. Therefore, designing a simple, effective, economical and environmental-friendly method for preparing carbon quantum dots materials has a very important research value and industrial significance.

Document (Photo-Fenton reaction of graphene oxide: A new strategy to prepare graphene quantum dots for DNA cleavage. Acs Nano 6.8 (2012): 6592-6599) reports a strategy for preparing graphene quantum dots by Fenton method, and the principle thereof is that: GO is oxidized directly by the hydroxyl radicals generated by Fenton reaction, producing a large amount of GQDs. This method is simple and convenient, but the addition of iron ions will make the separation of smaller size graphene quantum dots extremely difficult. Document (Molecular mechanism for metal-independent production of hydroxyl radicals by hydrogen peroxide and halogenated quinone. PNAS 104 (2007): 17575-17578) reports that tetrachlorobenzoquinone, which is a metabolite of chlorophenol, can react with $H_2O_2$ to produce hydroxyl radicals by a process independent of metal ions, and meanwhile halogen atoms are removed from chloroquinone for detoxification. This method has a low cost and can achieve degradation of pollutants simultaneously, and therefore is an ideal new preparation method for radicals.

However, so far, there has not been a method for preparing quantum dots using radicals produced by a metal-free catalysis.

CONTENTS OF THE INVENTION

In view of the problems existing in the prior art, the purpose of the present invention lies in providing carbon quantum dots, preparation method and uses thereof. The preparation method of carbon quantum dots is an advanced oxidation method independent of metal, and has a low cost for preparing carbon quantum dots, a mild reaction condition, and no secondary pollution. In addition, quantum dots prepared by this method have a good dispersibility and can be easily separated. This method can also treat pollution using pollutants. Thus, this method has great application value in the fields of organic pollutant degradation, electrochemical sensors, super capacitors, luminescent materials and photoelectric devices, etc.

In order to achieve this purpose, the present invention employs the following technical solutions:

A method for preparing carbon quantum dots, comprising the steps of:

(1) preparing a dispersion of carbon based material;

(2) mixing a solution of halogenated quinone with the dispersion of carbon based material and preparing a dispersion of carbon based-halogenated quinone composite material by halogenated quinone grafting method;

(3) adding a solution of $H_2O_2$ to the dispersion of carbon based-halogenated quinone composite material and carrying out reaction thereof, obtaining reaction products; and (4) carrying out solid-liquid separation to the reaction products, with the resulting filtrate continuing to react, thus obtaining a dispersion of carbon quantum dots.

The theoretical basis of the preparation method of carbon quantum dots of the present invention is that: halogenated quinone can produce hydroxyl radicals independent of transition metal ions in the presence of $H_2O_2$; carbon skeleton of a carbon material itself has surface oxygen-containing groups and surface defects; and hydroxyl radicals further produce oxidation effect to cut and oxidize carbon materials into carbon quantum dots having a size of below 100 nm. Carbon quantum dots can further facilitate the formation of radicals.

The preparation method of the dispersion of carbon based material in step (1) is as follows: the carbon based material is ultrasonic dispersed in a solvent.

The ultrasonic power is 50-200 W, for example 60 W, 70 W, 80 W, 100 W, 120 W, 150 W or 180 W, etc., preferably 50-80 W.

The ultrasonic time is 0.5-24 h, for example 1 h, 2 h, 3 h, 5 h, 8 h, 10 h, 12 h, 15 h, 18 h, 20 h or 22 h, etc., preferably 1-5 h.

The solvent is water.

The carbon based material in step (1) is any one selected from the group consisting of graphite oxide, graphene, carbon nanotube, activated carbon, carbon fiber, carbon black, carbonized natural organic matter, or a combination of at least two selected therefrom. Typical but not limiting combinations are: graphite oxide and graphene; carbon nanotube, activated carbon and carbon fiber; carbon black and carbonized natural organic matter; graphite oxide, graphene, carbon nanotube and activated carbon; carbon fibers, carbon black and carbonized natural organic matter; and others.

The concentration of the carbon based material in the dispersion of carbon based material in step (1) is 0.001-10 mg/mL, for example 0.005 mg/mL, 0.01 mg/ml, 0.02 mg/ml, 0.05 mg/ml, 0.08 mg/ml, 0.1 mg/ml, 0.5 mg/ml, 1 mg/ml, 1.2 mg/ml, 2 mg/ml, 3 mg/ml, 5 mg/ml, 8 mg/ml, or 9 mg/ml, etc., preferably 1-3 mg/mL.

The halogenated quinone grafting method in step (2) is carried out by mixing a solution of halogenated quinone with carbon based material and then applying ultrasonic wave.

The mixing method is carried out by dropwise adding a solution of halogenated quinone to a dispersion of carbon based material.

The ultrasonic power is 50-200 W, for example 60 W, 70 W, 75 W, 100 W, 120 W, 150 W, 180 W or 190 W, etc., preferably 50-80 W.

The ultrasonic time is 0.5-48 h, for example 1 h, 2 h, 5 h, 8 h, 10 h, 12 h, 15 h, 20 h, 25 h, 30 h, 35 h, 40 h or 45 h, etc., preferably 1-8 h.

After mixing a solution of halogenated quinone with a dispersion of carbon based material, the pH of the mixture is 4-9, for example, 4, 5, 6, 7, 8 or 9, etc., preferably 6-8.

The halogenated quinone in the solution of halogenated quinone in step (2) is any one selected from the group consisting of monochloroquinone, dichlorobenzoquinone, trichlorobenzoquinone, tetrachlorobenzoquinone, monobromoquinone, dibromobenzoquinone, tribromobenzoquinone, tetrabromobenzoquinone, or tetrafluorobenzoquinone, or a combination of at least two selected therefrom. Typical but not limiting combinations are: monochloroquinone and dichlorobenzoquinone; monobromoquinone and dibromobenzoquinone; trichlorobenzoquinone, tetrachlorobenzoquinone and monobromoquinone; dibromobenzoquinone, tribromobenzoquinone, tetrabromobenzoquinone and tetrafluorobenzoquinone; dichlorobenzoquinone, trichlorobenzoquinone, tetrachlorobenzoquinone and monobromoquinone; and others.

The solvent of the solution of halogenated quinone in step (2) is any one selected from the group consisting of acetonitrile, ethanol, DMSO (dimethyl sulfoxide), or DMF (dimethylformamide), or a combination of at least two selected therefrom. Typical but not limiting combinations are: acetonitrile and ethanol; DMSO and DMF; acetonitrile, ethanol and DMSO; acetonitrile, ethanol, DMSO and DMF; and others.

The mass concentration ratio of the solution of halogenated quinone to the dispersion of carbon based material in step (2) is 0.1-30, for example 0.5, 0.8, 1, 2, 3, 5, 8, 10, 12, 15, 20, 25 or 28, etc., preferably 1-3.

The volume ratio of the solvent of the solution of halogenated quinone to that of the dispersion of carbon based-halogenated quinone composite material in step (2) is 1-50%, for example 2%, 5%, 10%, 15%, 20%, 25%, 30%, 35%, 40%, 45% or 48%, etc., preferably 2-10%.

The mass concentration ratio of the solution of $H_2O_2$ to the solution of halogenated quinone in step (3) is 1-20, for example 2, 5, 8, 10, 12, 15 or 18, etc., preferably 5-10.

The concentration of the solution of $H_2O_2$ in step (3) is 0.1-100 mM, for example 0.2 mM, 0.5 mM, 1.5 mM, 1 mM, 5 mM, 10 mM, 15 mM, 35 mM, 50 mM, 75 mM or 95 mM, etc., preferably 5-50 mM. Said mM refers to mmol/L.

In steps (3), the reaction is carried out in a water bath under stirring.

The stirring rate is 50-300 r/min, for example 60 r/min, 70 r/min, 80 r/min, 90 r/min, 100 r/min, 120 r/min, 150 r/min, 180 r/min, 200 r/min, 220 r/min, 250 r/min or 280 r/min, etc., preferably 100 r/min.

The temperature of water bath is 15-35° C., for example 18° C., 20° C., 22° C., 25° C., 28° C., 30° C., 32° C. or 34° C., etc., preferably 25° C.

In step (3), the reaction temperature is 20-80° C., for example 25° C., 30° C., 40° C., 45° C., 50° C., 60° C., 70° C. or 75° C., etc., preferably 20-35° C.

Preferably, in step (3), the reaction time is 0.1-48 h, for example 0.5 h, 1 h, 2 h, 3 h, 4 h, 8 h, 10 h, 20 h, 30 h, 35 h, 40 h or 45 h, etc., preferably 0.1-5 h.

In step (4), the solid-liquid separation is carried out by membrane filtration.

In step (4), the filtration membrane used in the process of membrane filtration is any one selected from the group consisting of polyethersulfone membrane, polytetrafluoroethylene membrane, glass fiber membrane, polyvinylidene fluoride membrane, or polyamide membrane, or a combination of at least two selected therefrom. Typical but not limiting combinations are: polyethersulfone membrane and polytetrafluoroethylene membrane; glass fiber membrane, polyvinylidene fluoride membrane and polyamide membrane; polyethersulfone membrane, polytetrafluoroethylene membrane, glass fiber membrane and polyvinylidene fluoride membrane; polyethersulfone membrane, polytetrafluoroethylene membrane, glass fiber membrane, polyvinylidene fluoride membrane and polyamide membrane; and others.

In step (4), the reaction is carried out in a water bath under stirring.

In step (4), the temperature of water bath is 15-35° C., for example 18° C., 20° C., 22° C., 24° C., 26° C., 28° C., 30° C., 32° C. or 34° C., etc., preferably 25° C.

In step (4), the time for stirring is 2-72 h, for example 5 h, 8 h, 10 h, 15 h, 18 h, 20 h, 25 h, 30 h, 35 h, 40 h, 50 h, 60 h, 65 h, or 70 h, etc., preferably 12-48 h.

In order to make carbon quantum dots easy for storage and transportation while maintaining original properties, the method for preparing carbon quantum dots further comprises step (5): carrying out vacuum freeze drying to the dispersion of carbon quantum dots, and thus obtaining solid carbon quantum dots.

In step (5), the drying temperature of the vacuum freeze drying is from −10° C. to −100° C., for example −15° C., −20° C., −25° C., −30° C., −35° C., −40° C., −50° C., −60° C., −70° C., −80° C., −90° C. or −95° C., etc., preferably from −50° C. to −70° C.

In step (5), the vacuum degree of the vacuum freeze drying is 2-10 Pa, for example, 2.5 Pa, 3 Pa, 5 Pa, 7 Pa, 8 Pa or 9 Pa, etc., preferably 5-8 Pa.

In step (5), the drying time of the vacuum freeze drying is 0.5 h-48 h, for example 0.8 h, 1 h, 2 h, 3 h, 5 h, 8 h, 10 h, 12 h, 15 h, 18 h, 20 h, 25 h, 28 h, 30 h, 35 h, 40 h or 45 h, etc., preferably 20-30 h.

As a preferable technical solution, a method for preparing carbon quantum dots comprises the following steps:

(1) ultrasonic dispersing carbon based material into water, with an ultrasonic power of 50-200 W, for 0.5-24 h, thereby obtaining a dispersion of carbon based material having a concentration of 0.001-10 mg/mL;

(2) adding dropwise a solution of halogenated quinone to the dispersion of carbon based material, with the mass concentration ratio of the solution of halogenated quinone to the dispersion of carbon based material being 0.1-30, applying ultrasonic wave for 0.5-48 h, the pH of the mixed solution being adjusted to be 4-9, and thereby obtaining a dispersion of carbon based-halogenated quinone composite material;

(3) adding a solution of $H_2O_2$ to the dispersion of carbon based-halogenated quinone composite material and carrying out reaction thereof, with the mass concentration ratio of the solution of $H_2O_2$ to the solution of halogenated quinone being 1-20, the reaction temperature being 20-80° C., and the reaction time being 0.1-48 h; during the reaction, stirring the mixture at a rate of 50-300 r/min; and thereby obtaining reaction products;

(4) filtering the reaction products using a filtration membrane, with the resulting filtrate continuing to react at 15-35° C. in a water bath under stirring for 2-72 h, and thereby obtaining a dispersion of carbon quantum dots; and (5) carrying out vacuum freeze drying to the dispersion of carbon quantum dots at a temperature of from −10° C. to −100° C. for 0.5 h-48 h, and thereby obtaining carbon quantum dots.

The present invention also provides carbon quantum dots prepared by the method described above. The carbon quantum dots have a uniform size of 8-15 nm, for example 9 nm, 10 nm, 11 nm, 12 nm or 14 nm, etc., and a good dispersibility, and can be easily separated.

The present invention also provides uses of the carbon quantum dots in the fields of organic pollutant degradation, electrochemical sensors, super capacitors, luminescent materials, or optoelectronic devices.

Compared with the prior art, the present invention has the following beneficial effects:
1. The preparation method of carbon quantum dots of the present invention adopts metal-free catalytic oxidation, which has a safe and convenient process, and can effectively generate hydroxyl radicals and cut carbon to form quantum dots without using metal catalysts. Meanwhile, this method reduces the toxicity of the reaction organic matters, and also makes a low cost for preparing carbon quantum dots.
2. When compared with the existing method for preparing carbon quantum dots, the method of the present invention is performed under milder conditions, without needing light, radiation and high temperature heating, and has no secondary pollution. In addition, there is no need to add additional substances which are difficult to be separated. Also, the prepared carbon quantum dots have a good dispersibility and can be easily separated.
3. The preparation method of carbon quantum dots of the present invention can achieve pollution treatment using pollutants. Thus, this method has a broad application prospect in the fields of organic pollutant degradation, electrochemical sensors, super capacitors, luminescent materials and photoelectric devices, etc.

EMBODIMENTS

Hereinafter, the technical solution of the present invention is further described by the specific embodiments in combination with the figures. However, the following examples are merely simple examples of the present invention and do not represent or limit the scope claimed by the present invention, and the scope of the present invention is defined by the claim set.

Example 1

(1) Graphite oxide was prepared by a modified Hummers method. 1.5 mg/mL of graphite oxide solution (GO) was treated in water by ultrasonic wave for 1 h with an ultrasonic power of 50 W, to form a homogeneous dispersion;
(2) Tetrachlorobenzoquinone was dissolved in 5% ethanol solution. The tetrachlorobenzoquinone solution was added dropwise to the dispersion obtained in step (1), with the concentration ratio of tetrachlorobenzoquinone to graphene being 3:1. The pH of the solution was adjusted to be 7 using NaOH. Then grafting was carried out by using ultrasonic wave for 2 h. And thereby, a dispersion of graphene oxide-halogenated quinone composite material was obtained;
(3) $H_2O_2$ solution was added to the solution obtained in step (2), wherein the concentration ratio of $H_2O_2$ to tetrachlorobenzoquinone was 10:1, and the system was then stirred in a water bath at 25° C. for 0.5 h;
(4) The solution obtained after the reaction in step (3) was filtered using polytetrafluoroethylene filtration membrane, and the filtrate continued to be stirred in a water bath for 24 h, and then a dispersion of carbon quantum dots was obtained; and
(5) The obtained dispersion of carbon quantum dots was vacuum freeze dried for 48 h at −50° C. with a vacuum degree of 5 Pa, and then solid graphene quantum dots were obtained.

Figure 1:
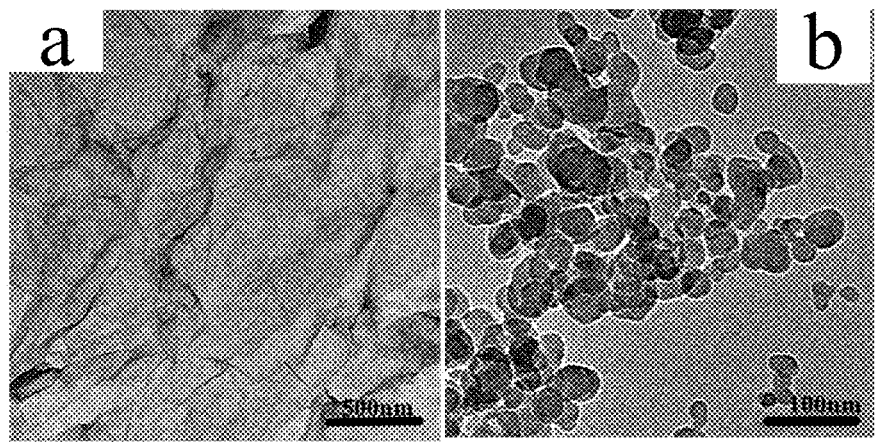
FIG. 1 shows transmission electron microscope (TEM) photographs of materials prepared by Example 1 of the present invention, wherein (a) shows a transmission electron microscope photograph of graphite oxide before reacting, and (b) shows a transmission electron microscope photograph of prepared graphene quantum dots.

FIG. 1 shows transmission electron microscopy (TEM) photographs of materials prepared by the present example, wherein (a) shows a transmission electron microscope photograph of graphite oxide before reacting, and (b) shows a transmission electron microscope photograph of prepared graphene quantum dots.

Figure 2:
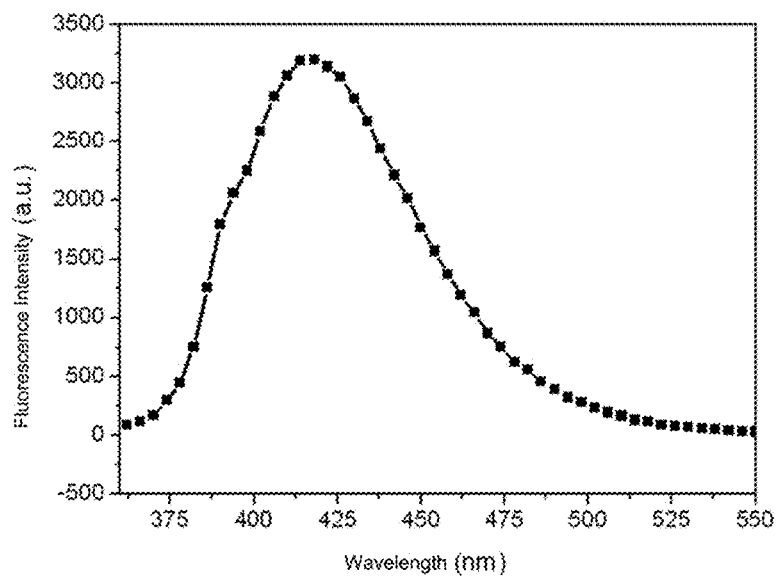
FIG. 2 shows a fluorescence spectrum curve of graphene quantum dots prepared by Example 1 of the present invention, wherein the excitation wavelength is 330 nm.

FIG. 2 shows a fluorescence spectrum curve of graphene quantum dots prepared by the present example, wherein the excitation wavelength is 330 nm.

As can be seen from the TEM and fluorescence spectroscopy analysis, the graphene quantum dots obtained in this example have a uniform distribution, and a size of about 10 nm, and when the excitation wavelength is 330 nm, the intensity exhibits a maximum value at the emission spectrum of 425 nm and the maximum intensity value is above 3000. This material can be used in light emitting devices.

Example 2

(1) 2 mg/mL of graphene solution was treated in water by ultrasonic wave for 1.5 h at an ultrasonic power of 50 W, to form a homogeneous dispersion;
(2) 2,5-dichloro-1,4-benzoquinone was dissolved in 3% acetonitrile solution. The 2,5-dichloro-1,4-benzoquinone solution was added dropwise to the dispersion obtained in step (1), with the concentration ratio of 2,5-dichloro-1,4-benzoquinone to graphene being 2:1. The pH of the solution was adjusted to be 7 using NaOH. Then grafting was carried out by using ultrasonic wave for 2 h. And thereby, a dispersion of graphene oxide-halogenated quinone composite material was obtained;
(3) $H_2O_2$ was added to the solution obtained in step (2), wherein the concentration ratio of $H_2O_2$ to 2,5-dichloro-1,4-benzoquinone was 5:1, and the system was then stirred in a water bath at 25° C. for 1 h;
(4) The solution obtained after the reaction in step (3) was filtered using polytetrafluoroethylene filtration membrane, and the filtrate continued to be stirred in a water bath for 30 h, and then a dispersion of carbon quantum dots was obtained; and
(5) The dispersion of carbon quantum dots was vacuum freeze dried for 48 h at −50° C. with a vacuum degree of 8 Pa, and then solid graphene quantum dots were obtained.

It can be seen from the TEM and fluorescence spectroscopy analysis that: the graphene quantum dots obtained in this Example have a uniform distribution, and a size of about 10 nm, and transmission electron microscope photographs in this example are similar to those in example 1; when the excitation wavelength is 330 nm, the intensity exhibits a maximum value at the emission spectrum of 425 nm and the maximum intensity value is above 2500, and the fluorescence spectrum in this Example is similar to that in example 1. This material can be used in light emitting devices.

Example 3

(1) 1 mg/mL of carbon nanotube solution was treated in water by ultrasonic wave for 1 h at an ultrasonic power of 60 W, to form a homogeneous dispersion;
(2) Tetrabromobenzoquinone was dissolved in 5% ethanol solution. The tetrabromobenzoquinone solution was added dropwise to the dispersion obtained in step (1), with the concentration ratio of tetrabromobenzoquinone to carbon nanotube being 2:1. The pH of the solution was adjusted to be 7 using NaOH. Then grafting was carried out by using ultrasonic wave for 2 h. And thereby, a dispersion of carbon nanotube-halogenated quinone composite material was obtained;
(3) $H_2O_2$ was added to the solution obtained in step (2), wherein the concentration ratio of $H_2O_2$ to tetrabromobenzoquinone was 8:1, and the system was then stirred in a water bath at 25° C. for 0.5 h;
(4) The solution obtained after the reaction in step (3) was filtered using polytetrafluoroethylene filtration membrane, and the filtrate continued to be stirred in a water bath for 24 h, and then a dispersion of carbon quantum dots was obtained; and
(5) The dispersion of carbon quantum dots was vacuum freeze dried for 40 h at −60° C. with a vacuum degree of 6 Pa, and then solid carbon quantum dots were obtained.

It can be seen from the TEM and fluorescence spectroscopy analysis that: transmission electron microscope photographs in this Example are similar to those in example 1, and the carbon quantum dots have a uniform distribution, and a size of about 15 nm; when the excitation wavelength is 330 nm, the intensity exhibits a maximum value at the emission spectrum of 425 nm and the maximum intensity value is above 2000, and the fluorescence spectrum in this example is similar to that in Example 1. This material can be used in electrochemical sensors.

Example 4

(1) 1.5 mg/mL of carbon fiber material solution was treated in water by ultrasonic wave for 2 h at an ultrasonic power of 50 W, to form a homogeneous dispersion;
(2) 2,3,5-trichloro-1,4-benzoquinone was dissolved in 4% DMF solution. The 2,3,5-trichloro-1,4-benzoquinone solution was added dropwise to the dispersion obtained in step (1), with the concentration ratio of 2,3,5-trichloro-1,4-benzoquinone to carbon fiber material being 1.5:1. The pH of the solution was adjusted to be 6.8 using NaOH. Then grafting was carried out by using ultrasonic wave for 1 h. And thereby, a dispersion of carbon fiber-halogenated quinone composite material was obtained;
(3) $H_2O_2$ was added to the solution obtained in step (2), wherein the concentration ratio of $H_2O_2$ to 2,3,5-trichloro-1,4-benzoquinone was 5:1, and the system was then stirred in a water bath at 20° C. for 0.5 h;
(4) The solution obtained after the reaction in step (3) was filtered using polytetrafluoroethylene filtration membrane, and the filtrate continued to be stirred in a water bath for 40 h, and then a dispersion of carbon quantum dots was obtained; and
(5) The dispersion of carbon quantum dots was vacuum freeze dried for 24 h at −60° C. with a vacuum degree of 7 Pa, and then solid carbon quantum dots were obtained.

It can be seen from the TEM and fluorescence spectroscopy analysis that: transmission electron microscope photographs in this example are similar to those in Example 1, and the carbon quantum dots have a uniform distribution, and a size of about 12 nm; when the excitation wavelength is 330 nm, the intensity exhibits a maximum value at the emission spectrum of 425 nm and the maximum intensity value is above 2200, and the fluorescence spectrum in this example is similar to that in Example 1. This material can be used in super capacitors.

Example 5

(1) Graphite oxide was prepared by Hummers method. 2 mg/mL of graphite oxide solution (GO) was treated in water by ultrasonic wave for 1 h at an ultrasonic power of 50 W, to form a homogeneous dispersion;
(2) Tetrachlorobenzoquinone was dissolved in 2% ethanol solution. The tetrachlorobenzoquinone solution was added dropwise to the dispersion obtained in step (1), with the concentration ratio of tetrachlorobenzoquinone to graphene being 2.5:1. The pH of the solution was adjusted to be 6.8 using NaOH. Then grafting was carried out by using ultrasonic wave for 1 h. And thereby, a dispersion of graphene oxide-halogenated quinone composite material was obtained;
(3) $H_2O_2$ was added to the solution obtained in step (2), wherein the concentration ratio of $H_2O_2$ to tetrachlorobenzoquinone was 2.5:1, and the system was then stirred in a water bath at 25° C. for 2 h;
(4) The solution obtained after the reaction in step (3) was filtered using polyethersulfone filtration membrane, and the filtrate continued to be stirred in a water bath for 24 h, and then a dispersion of carbon quantum dots dispersed homogeneously was obtained; and
(5) The dispersion of carbon quantum dots was vacuum freeze dried for 20 h at −50° C. with a vacuum degree of 8 Pa, and then solid graphene quantum dots were obtained.

It can be seen from the TEM and fluorescence spectroscopy analysis that: transmission electron microscope photographs in this example are similar to those in Example 1, and the graphene quantum dots have a uniform distribution, and a size of about 8 nm; when the excitation wavelength is 330 nm, the intensity exhibits a maximum value at the emission spectrum of 425 nm and the maximum intensity value is above 3500, and the fluorescence spectrum in this Example is similar to that in Example 1. This material can be used in super capacitors.

Example 6

(1) 3 mg/mL of activated carbon solution was treated in water by ultrasonic wave for 2 h at an ultrasonic power of 80 W, to form a homogeneous dispersion;
(2) Tetrabromobenzoquinone was dissolved in 5% DMF solution. The tetrabromobenzoquinone solution was added dropwise to the dispersion obtained in step (1), with the concentration ratio of tetrabromobenzoquinone to activated carbon being 3:1. The pH of the solution was adjusted to be 6.8 using NaOH. Then grafting was carried out by using ultrasonic wave for 1 h. And thereby, a dispersion of activated carbon-halogenated quinone composite material was obtained;
(3) $H_2O_2$ was added to the solution obtained in step (2), wherein the concentration ratio of $H_2O_2$ to tetrabromobenzoquinone was 2:1, and the system was then stirred in a water bath at 25° C. for 2.5 h;

(4) The solution obtained after the reaction in step (3) was filtered using polyethersulfone filtration membrane, and the filtrate continued to be stirred in a water bath for 48 h, and then a dispersion of carbon quantum dots dispersed homogeneously was obtained; and (5) The dispersion of carbon quantum dots was vacuum freeze dried for 24 h at −50° C. with a vacuum degree of 5 Pa, and then solid carbon quantum dots were obtained.

It can be seen from the TEM and fluorescence spectroscopy analysis that: transmission electron microscope photographs in this Example are similar to those in Example 1, and the carbon quantum dots have a uniform distribution, and a size of about 10 nm; when the excitation wavelength is 330 nm, the intensity exhibits a maximum value at the emission spectrum of 425 nm and the maximum intensity value is above 3800, and the fluorescence spectrum in this Example is similar to that in Example 1. This material can be used in degradation of organic matters and in photosensitive materials.

Example 7

(1) Graphite oxide was prepared by Hummers method. 2 mg/mL of graphite oxide solution (GO) was treated in water by ultrasonic wave for 0.5 h at an ultrasonic power of 200 W, to form a homogeneous dispersion;

(2) Trichlorobenzoquinone and tetrabromobenzoquinone were dissolved in a 2% mixed solution of ethanol and DMF. The trichlorobenzoquinone and tetrabromobenzoquinone solution was added dropwise to the dispersion obtained in step (1), with the concentration ratio of trichlorobenzoquinone and tetrabromobenzoquinone to graphene being 0.1:1. The pH of the solution was adjusted to be 4 using NaOH. Then grafting was carried out by using ultrasonic wave for 1 h. And thereby, a dispersion of graphene oxide-halogenated quinone composite material was obtained;

(3) $H_2O_2$ was added to the solution obtained in step (2), wherein the concentration ratio of $H_2O_2$ to trichlorobenzoquinone and tetrabromobenzoquinone was 1:1, and the system was then stirred at a rate of 50 r/min in a water bath at 15° C. for 48 h;

(4) The solution obtained after the reaction in step (3) was filtered using polyamide membrane, and the filtrate continued to be stirred in a water bath at 20° C. for 72 h, and then a dispersion of carbon quantum dots was obtained; and (5) The dispersion of carbon quantum dots obtained in step (4) was vacuum freeze dried for 0.5 h at −100° C. with a vacuum degree of 2 Pa, and then solid graphene quantum dots were obtained.

It can be seen from the TEM and fluorescence spectroscopy analysis that: transmission electron microscope photographs in this Example are similar to those in Example 1, and the graphene quantum dots have a uniform distribution, and a size of about 10 nm; when the excitation wavelength is 330 nm, the intensity exhibits a maximum value at the emission spectrum of 425 nm and the maximum intensity value is above 3500, and the fluorescence spectrum in this Example is similar to that in Example 1. This material can be used in super capacitors.

Example 8

(1) Graphite oxide was prepared by Hummers method. 2 mg/mL of graphite oxide solution (GO) was treated in water by ultrasonic wave for 24 h at an ultrasonic power of 50 W, to form a homogeneous dispersion;

(2) Tetrachlorobenzoquinone and dichlorobenzoquinone were dissolved in 2% ethanol solution. The tetrachlorobenzoquinone and dichlorobenzoquinone solution was added dropwise to the dispersion obtained in step (1), with the concentration ratio of tetrachlorobenzoquinone and dichlorobenzoquinone to graphene being 30:1. The pH of the solution was adjusted to be 9 using NaOH. Then grafting was carried out by using ultrasonic wave for 0.1 h. And thereby, a dispersion of graphene oxide-halogenated quinone composite material was obtained;

(3) $H_2O_2$ was added to the solution obtained in step (2), wherein the concentration ratio of $H_2O_2$ to tetrachlorobenzoquinone and dichlorobenzoquinone was 20:1, and the system was then stirred at a rate of 300 r/min in a water bath at 80° C. for 0.1 h;

(4) The solution obtained after the reaction in step (3) was filtered using polyvinylidene fluoride membrane and glass fiber membrane, and the filtrate continued to be stirred in a water bath at 35° C. for 2 h, and then a dispersion of carbon quantum dots was obtained; and (5) The dispersion of carbon quantum dots obtained in step (4) was vacuum freeze dried for 48 h at −10° C. with a vacuum degree of 10 Pa, and then solid graphene quantum dots were obtained.

It can be seen from the TEM and fluorescence spectroscopy analysis that: transmission electron microscope photographs in this Example are similar to those in Example 1, and the graphene quantum dots have a uniform distribution, and a size of about 9 nm; when the excitation wavelength is 330 nm, the intensity exhibits a maximum value at the emission spectrum of 425 nm and the maximum intensity value is above 3500, and the fluorescence spectrum in this Example is similar to that in Example 1. This material can be used in super capacitors.

The applicant states that: the above are only specific examples of the present invention; however, the present invention is not limited thereto. Those skilled in the art to which the present invention belongs should appreciate that any change or replacement which can be easily thought by those skilled in the art within the technical scope disclosed by the present invention all fall into the scope protected and disclosed by the present invention.

The invention claimed is:

1. A method for preparing carbon quantum dots, comprising the steps of
    (1) preparing a dispersion of carbon based material;
    (2) mixing a solution of halogenated quinone with the dispersion of carbon based material and preparing a dispersion of carbon based-halogenated quinone composite material by halogenated quinone grafting method;
    (3) adding a solution of $H_2O_2$ to the dispersion of carbon based-halogenated quinone composite material and carrying out reaction thereof, obtaining reaction products; and
    (4) carrying out solid-liquid separation to the reaction products, with the resulting filtrate continuing to react, thus obtaining a dispersion of carbon quantum dots.

2. The method according to claim 1, wherein the preparation method of the dispersion of carbon based material said in step (1) is as follows: the carbon based material is ultrasonic dispersed in a solvent.

3. The method according to claim 2, wherein the ultrasonic power is 50-200 W;
    the ultrasonic time is 0.5-24 h.

4. The method according to claim 2, wherein the solvent is water;

the carbon based material in step (1) is any one selected from the group consisting of graphite oxide, graphene, carbon nanotube, activated carbon, carbon fiber, carbon black, high temperature carbonized natural organic matter, or a combination of at least two selected therefrom;

the concentration of the carbon based material in the dispersion of carbon based material in step (1) is 0.001-10 mg/mL.

5. The method according to claim 1, wherein the halogenated quinone grafting method in step (2) is carried out by mixing a solution of halogenated quinone with carbon based material and then applying ultrasonic wave.

6. The method according to claim 5, wherein the mixing method is carried out by dropwise adding a solution of halogenated quinone to a dispersion of carbon based material.

7. The method according to claim 5, wherein the ultrasonic power is 50-200 W;

the ultrasonic time is 0.5-48 h;

after mixing a solution of halogenated quinone with a dispersion of carbon based material in step (2), the pH of the mixture is 4-9.

8. The method according to claim 1, wherein the halogenated quinone in the solution of halogenated quinone in step (2) is any one selected from the group consisting of monochloroquinone, dichlorobenzoquinone, trichlorobenzoquinone, tetrachlorobenzoquinone, monobromoquinone, dibromobenzoquinone, tribromobenzoquinone, tetrabromobenzoquinone, or tetrafluorobenzoquinone, or a mixture of at least two selected therefrom.

9. The method according to claim 1, wherein the solvent of the solution of halogenated quinone in step (2) is any one selected from the group consisting of acetonitrile, ethanol, DMSO, or DMF, or a combination of at least two selected therefrom.

10. The method according to claim 1, wherein the mass concentration ratio of the solution of halogenated quinone to the dispersion of carbon based material in step (2) is 0.1-30;

the volume ratio of the solvent of the solution of halogenated quinone to that of the dispersion of carbon based-halogenated quinone composite material in step (2) is 1-50%.

11. The method according to claim 1, wherein the mass concentration ratio of the solution of $H_2O_2$ to the solution of halogenated quinone in step (3) is 1-20;

the concentration of the solution of $H_2O_2$ in step (3) is 0.1-100 mM.

12. The method according to claim 1, wherein in steps (3), the reaction is carried out in a water bath under stirring;

the stirring rate is 50-300 r/min;

the temperature of water bath is 15-35° C.

13. The method according to claim 1, wherein in step (3), the reaction temperature is 20-80° C.;

in step (3), the reaction time is 0.1-48 h.

14. The method according to claim 1, wherein in step (4), the solid-liquid separation is carried out by membrane filtration;

the filtration membrane used in the process of membrane filtration is any one selected from the group consisting of polyethersulfone membrane, polytetrafluoroethylene membrane, glass fiber membrane, polyvinylidene fluoride membrane, or polyamide membrane, or a combination of at least two selected therefrom.

15. The method according to claim 1, wherein in step (4), the reaction is carried out in a water bath under stirring;

in step (4), the temperature of water bath is 15-35° C.;

in step (4), the time for stirring is 2-72 h.

16. The method according to claim 1, wherein the method further comprises step (5): carrying out vacuum freeze drying to the dispersion of carbon quantum dots, and thus obtaining solid carbon quantum dots.

17. The method according to claim 16, wherein the drying temperature of the vacuum freeze drying is from −10° C. to −100° C.

the vacuum degree of the vacuum freeze drying is 2-10 Pa;

the drying time of the vacuum freeze drying is 0.5 h-48 h.

18. The method according to claim 1, wherein the method comprises the following steps:

(1) ultrasonic dispersing carbon based material into water, with an ultrasonic power of 50-200 W, for 0.5-24 h, thereby obtaining a dispersion of carbon based material having a concentration of 0.001-10 mg/mL;

(2) adding dropwise a solution of halogenated quinone to the dispersion of carbon based material, with the mass concentration ratio of the solution of halogenated quinone to the dispersion of carbon based material being 0.1-30, applying ultrasonic wave for 0.5-48 h, then the pH of the mixed solution being adjusted to be 4-9, and thereby obtaining a dispersion of carbon based-halogenated quinone composite material;

(3) adding a solution of $H_2O_2$ to the dispersion of carbon based-halogenated quinone composite material and carrying out reaction thereof, with the mass concentration ratio of the solution of $H_2O_2$ to the solution of halogenated quinone being 1-20, the reaction temperature being 20-80° C., and the reaction time being 0.1-48 h; during the reaction, stirring the mixture at a rate of 50-300 r/min; and thereby obtaining reaction products;

(4) filtering the reaction products using a filtration membrane, with the resulting filtrate continuing to react at 15-35° C. in a water bath under stirring for 2-72 h, and thereby obtaining a dispersion of carbon quantum dots; and (5) carrying out vacuum freeze drying to the dispersion of carbon quantum dots at a temperature of from −10° C. to −100° C. for 0.5 h-48 h, and thereby obtaining carbon quantum dots.

* * * * *